(12) United States Patent
Wilson

(10) Patent No.: US 8,752,785 B2
(45) Date of Patent: Jun. 17, 2014

(54) SEMI-LEVERED ARTICULATED LANDING GEAR SYSTEM

(75) Inventor: Phillip K. Wilson, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 121 days.

(21) Appl. No.: 13/531,650

(22) Filed: Jun. 25, 2012

(65) Prior Publication Data

US 2013/0341457 A1    Dec. 26, 2013

(51) Int. Cl.
*B64C 25/00*    (2006.01)

(52) U.S. Cl.
USPC .................................. 244/17.17; 244/102 R

(58) Field of Classification Search
USPC ... 244/17.17, 102 R, 102 SL, 102 A, 102 SS, 244/104 FP, 104 R
See application file for complete search history.

(56) References Cited

U.S. PATENT DOCUMENTS

| | | | | |
|---|---|---|---|---|
| 2,691,496 | A | * | 10/1954 | Katzenberger ............ 244/103 R |
| 3,822,048 | A | * | 7/1974 | Hartel ....................... 244/104 R |
| 3,951,361 | A | * | 4/1976 | Hrusch ...................... 244/102 R |
| 4,047,681 | A | | 9/1977 | Hartel |
| 4,170,332 | A | | 10/1979 | Masclet et al. |
| 4,552,324 | A | * | 11/1985 | Hrusch ................... 244/104 FP |
| 4,892,270 | A | * | 1/1990 | Derrien et al. ............ 244/104 R |
| 4,984,755 | A | | 1/1991 | Derrien |
| 5,478,030 | A | * | 12/1995 | Derrien et al. ............ 244/102 R |
| 8,186,620 | B2 | | 5/2012 | Luce et al. |
| 2004/0262452 | A1 | * | 12/2004 | Derrien et al. ............ 244/102 A |
| 2006/0006282 | A1 | * | 1/2006 | Mellor et al. ............. 244/102 A |
| 2009/0050736 | A1 | | 2/2009 | Bennett et al. |
| 2009/0108131 | A1 | * | 4/2009 | Lavigne et al. ........... 244/102 A |
| 2010/0012778 | A1 | * | 1/2010 | Chow et al. .................... 244/1 N |
| 2011/0147518 | A1 | * | 6/2011 | Nannoni et al. .......... 244/102 A |
| 2011/0155845 | A1 | * | 6/2011 | Nannoni et al. ........... 244/17.17 |
| 2011/0233327 | A1 | * | 9/2011 | Mellor et al. ............. 244/102 A |
| 2012/0056035 | A1 | * | 3/2012 | Luce ....................... 244/102 SL |
| 2012/0091271 | A1 | * | 4/2012 | Bennett et al. ............ 244/102 R |

FOREIGN PATENT DOCUMENTS

EP        0564772 A1    10/1993

OTHER PUBLICATIONS

Extended European Search Report in related European Application No. 12190536.8, dated Jul. 26, 2013, 8 pages.

* cited by examiner

*Primary Examiner* — Christopher P Ellis
*Assistant Examiner* — Medhat Badawi
(74) *Attorney, Agent, or Firm* — Noah A. Tevis

(57) ABSTRACT

The landing gear system for an aircraft includes a shock strut assembly that is coupled to the airframe with a universal joint. A tire member is mounted to the shock strut assembly. The landing gear system also includes a drag brace assembly coupled to an airframe of the aircraft with a spindle, the spindle being rotatable about a spindle axis. A radius rod is rotatably coupled to the airframe of the aircraft. The radius rod and the shock strut assembly are retractable about a retraction rotation axis. Further, the spindle axis has a common intersection point with the centerline axis and the retraction rotation axis. The orientation of the spindle axis causes a translation of the tire member to have a longitudinal component during a compression of the shock strut assembly.

13 Claims, 12 Drawing Sheets

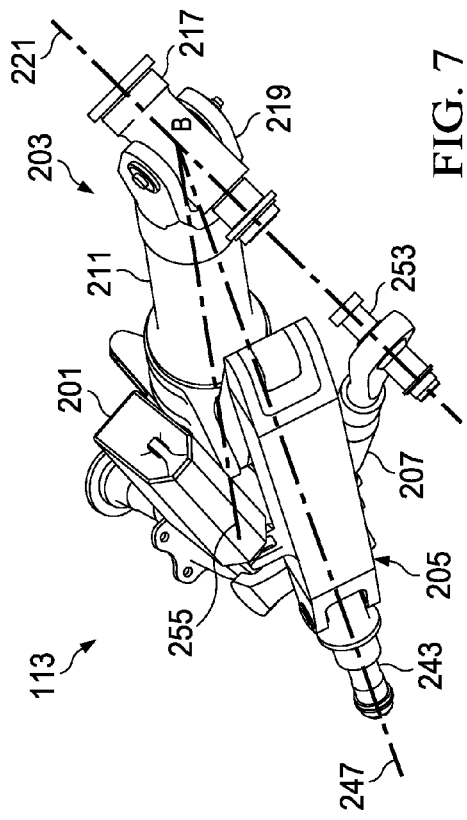
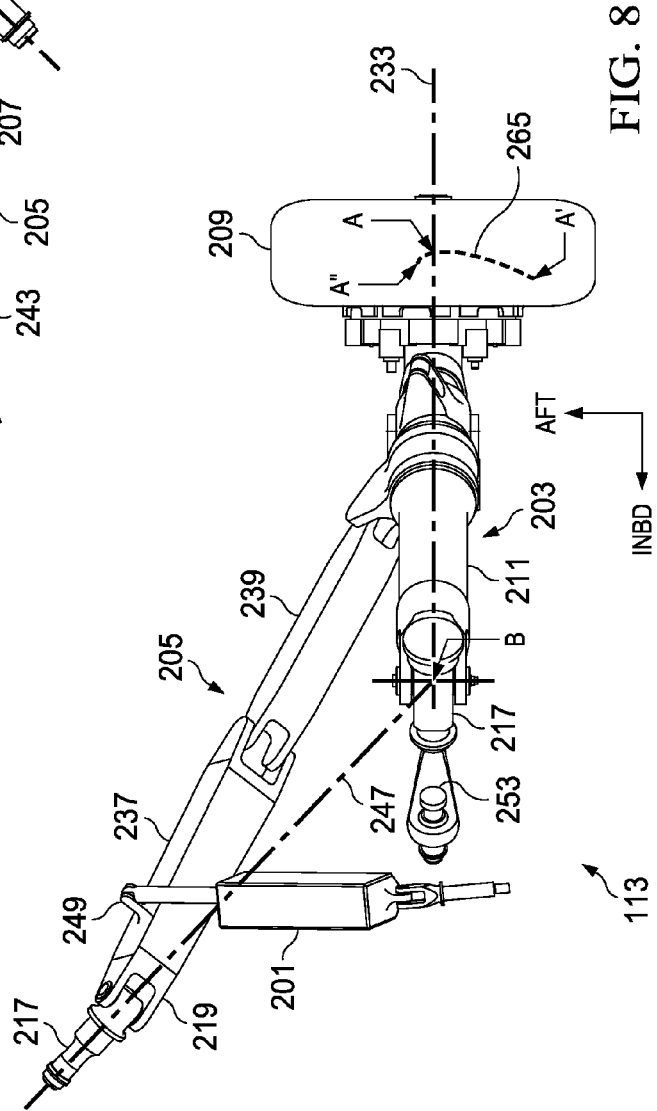

SEMI-LEVERED ARTICULATED LANDING GEAR SYSTEM

BACKGROUND

1. Technical Field

The present application relates to a landing gear system for an aircraft.

2. Description of Related Art

Conventional landing gear systems can be configured with a plurality of articulated members so as to be selectively retractable and deployable. Further, conventional landing gear systems can include a shock strut configured to stroke during a landing phase of the aircraft. In one conventional landing gear configuration, the geometric configuration of the members of the articulated members causes the tire member to primarily translate outboard during the stroke of the shock strut, otherwise known as a "scrubbing" of the tire member. Scrubbing of the tire can reduce the life of the tire, as well as cause irregular stroking of the shock strut.

Hence, there is a need for an improved landing gear system.

DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, wherein:

FIG. 7 is a view of the landing gear system in a retracted position, according to one example embodiment;

FIG. 8 is a view looking down of the landing gear system, according to one example embodiment;

DESCRIPTION OF THE PREFERRED EMBODIMENT

Illustrative embodiments of the system of the present application are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The landing gear system of the present application is a retractable wheeled landing gear for an aircraft. More specifically, the landing gear system of the present application is a main landing gear for a helicopter. The geometric configuration of the landing gear system causes the tire member to move or roll in fore/aft direction along an arcing path during a stroke translation of the shock strut, thereby reducing tire scrubbing and providing a smooth stroking of the shock strut. These and other advantages of the landing gear system are further described herein. Certain embodiments of the present application may include some, all, or none of the above advantages. One or more other technical advantages may be readily apparent to those skilled in the art from the figures, descriptions, and claims included herein.

Figure 1:
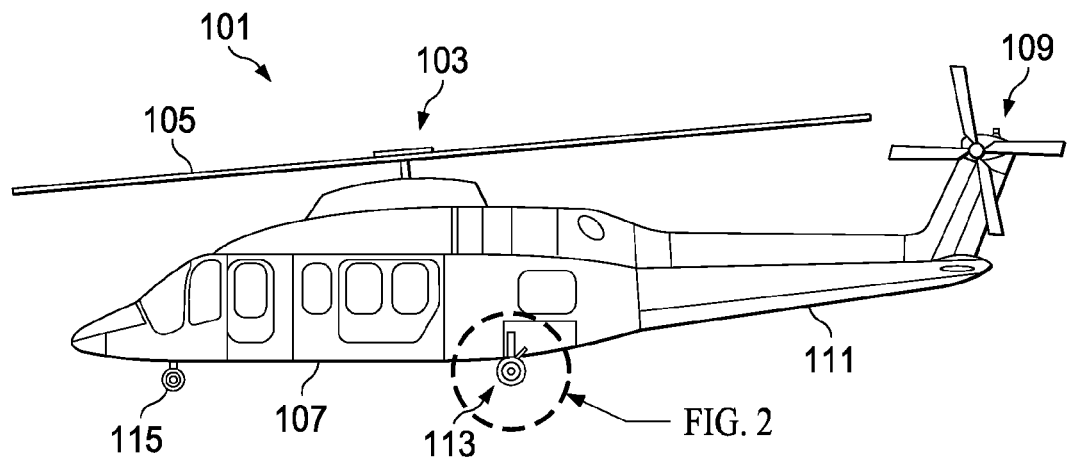
FIG. 1 is a side view of an aircraft having a landing gear system, according to one example embodiment.
Figure 2:
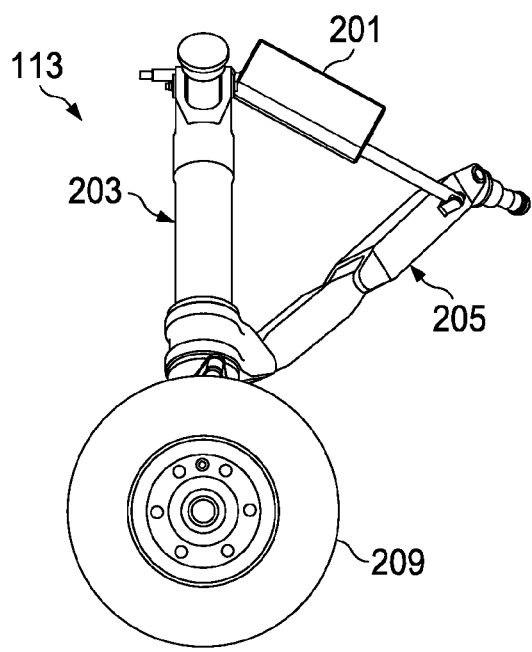
FIG. 2 is a side detail view of the landing gear system, according to one example embodiment.
Figure 3:
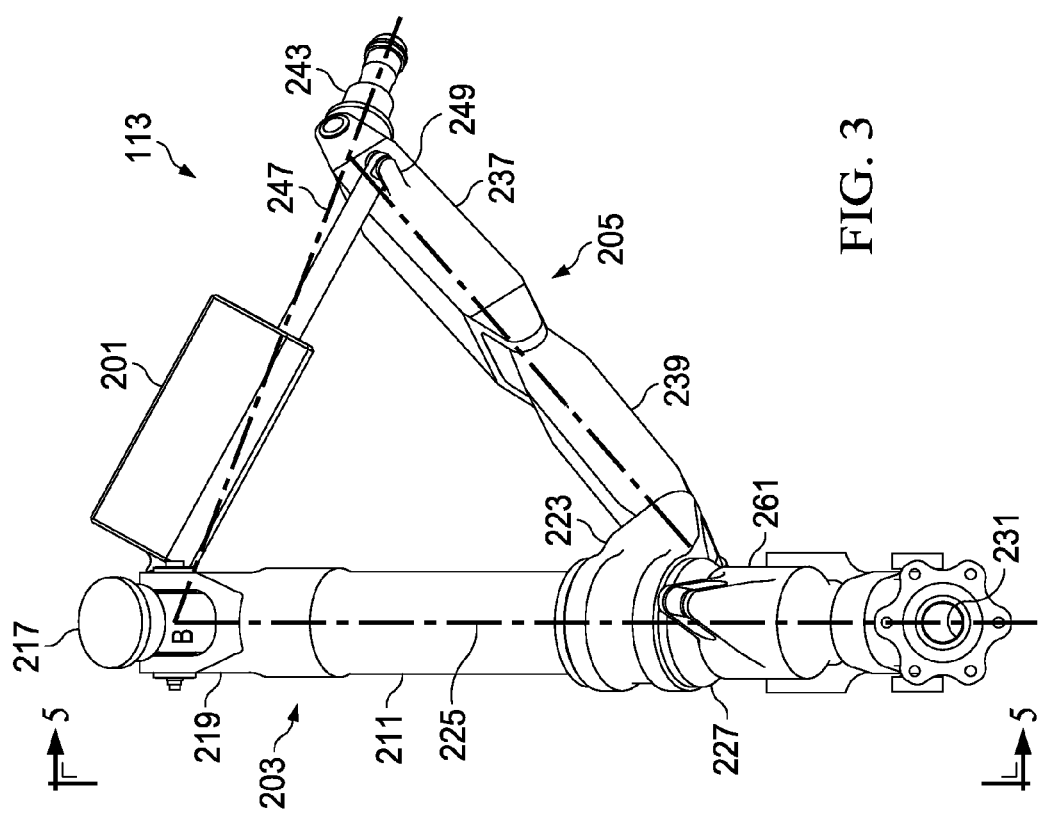
FIG. 3 is a side view looking inboard of the landing gear system, according to one example embodiment.
Figure 4:
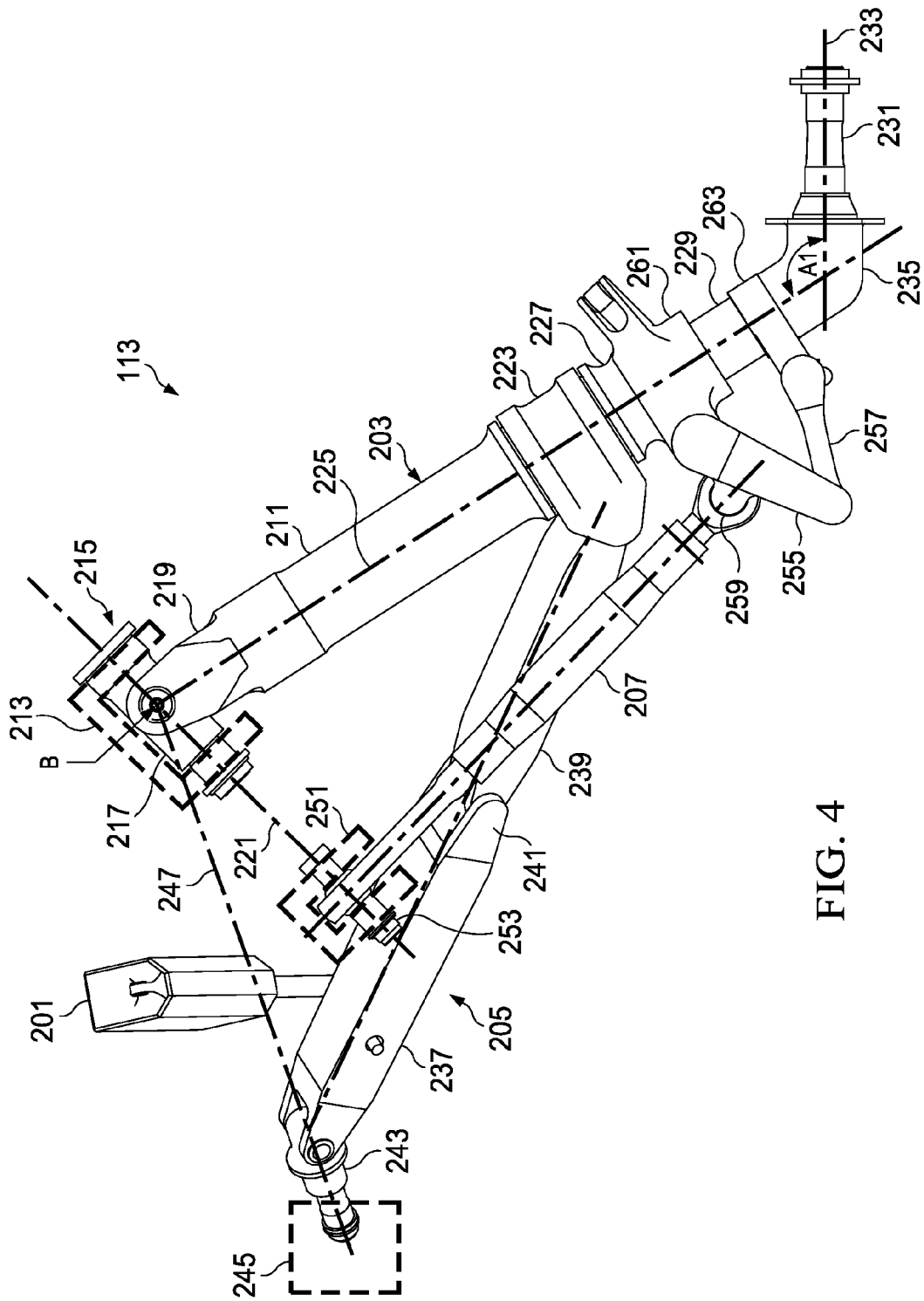
FIG. 4 is a view looking aft of the landing gear system, according to one example embodiment.

Referring now to FIG. 1 in the drawings, a rotorcraft 101 is illustrated. Rotorcraft 101 has a rotor system 103 with a plurality of rotor blades 105. The pitch of each rotor blade 105 can be selectively controlled in order to selectively control direction, thrust, and lift of rotorcraft 101. Rotorcraft 101 further includes a fuselage 107, anti-torque system 109, and an empennage 111. Rotorcraft 101 further includes a retractable main landing gear system 113, operable in conjunction with a retractable front gear 115, to provide ground support for the aircraft. Rotorcraft 101 is illustrated in conjunction with landing gear system 113 to provide structural and cooperative interrelationship between the landing gear system 113 and the fuselage structure. For the sake of clarity, landing gear system 113 is illustrated as the left side main landing gear; however, it should be fully appreciated that the right side main landing gear is a mirror image of the left side main landing gear, as one of ordinary skill in the art would fully appreciate having benefit of this disclosure. As such, the disclosure herein pertaining to landing gear system 113 as the left side main landing gear equally applies to the right side main landing gear.

It should be appreciated that rotorcraft 101 is merely illustrative of a wide variety of aircraft that can implement landing gear system 113. Further, even though landing gear system 113 is particularly well suited for a helicopter, landing gear system 113 may be implemented on other aircraft, such as fixed wing aircraft, tilt rotor aircraft, unmanned aircraft, gyrocopters, and spacecraft, to name a few examples.

Referring now to FIGS. 2-5, landing gear system 113 is illustrated in further detail. Primary components of landing gear system 113 include a strut assembly 203, a drag brace assembly 205, and a radius rod 207. In the illustrative embodiment, strut assembly 203 includes a fixed length portion 211 coupled to an airframe 213 of fuselage 107 via a universal joint 215. Universal joint 215 includes a clevis fitting 219 pivotally coupled to a trunnion 217. Clevis fitting 219 is rotatable about a clevis axis that is approximately parallel to a longitudinal axis of aircraft 101 when the landing gear system 113 is in a static position. Trunnion 217 is rotatably coupled to airframe 213 with bearings to allow trunnion 217 to rotate about a retraction rotation axis 221. Strut assembly 203 further includes a collar 223 that is configured to rotate about a centerline axis 225 of fixed length portion 211. Collar 223 is axially restricted along centerline axis 225 so that inputs from drag brace assembly 205 can retract and deploy strut assembly 203.

Strut assembly 203 further includes a shock absorber portion having a housing 227 which receives a piston rod 229. Piston rod 229 is configured to slidingly translate relative to housing 227 along centerline axis 225. Piston rod 229 and housing 227 include internal components for functionality of a shock absorber, such as an oleo strut shock absorber. For example, internal components can include a working fluid, such as air, oil, or combination thereof, in conjunction with chambers and orifices that can produce desired spring and damping characteristics, as known to one of ordinary skill in the art. It should be appreciated that the exact configuration of the shock absorber portion of strut assembly 203 is implementation specific. An axle spindle 231 is fixedly coupled to piston rod 229 via an elbow 235. Axle spindle 231 is configured for the rotation of tire member 209 about an axle spindle axis 233. Centerline axis 225 intersects axle spindle axis 233 at angle A1. In the illustrated embodiment, angle A1 is approximately 120 degrees.

Figure 5:
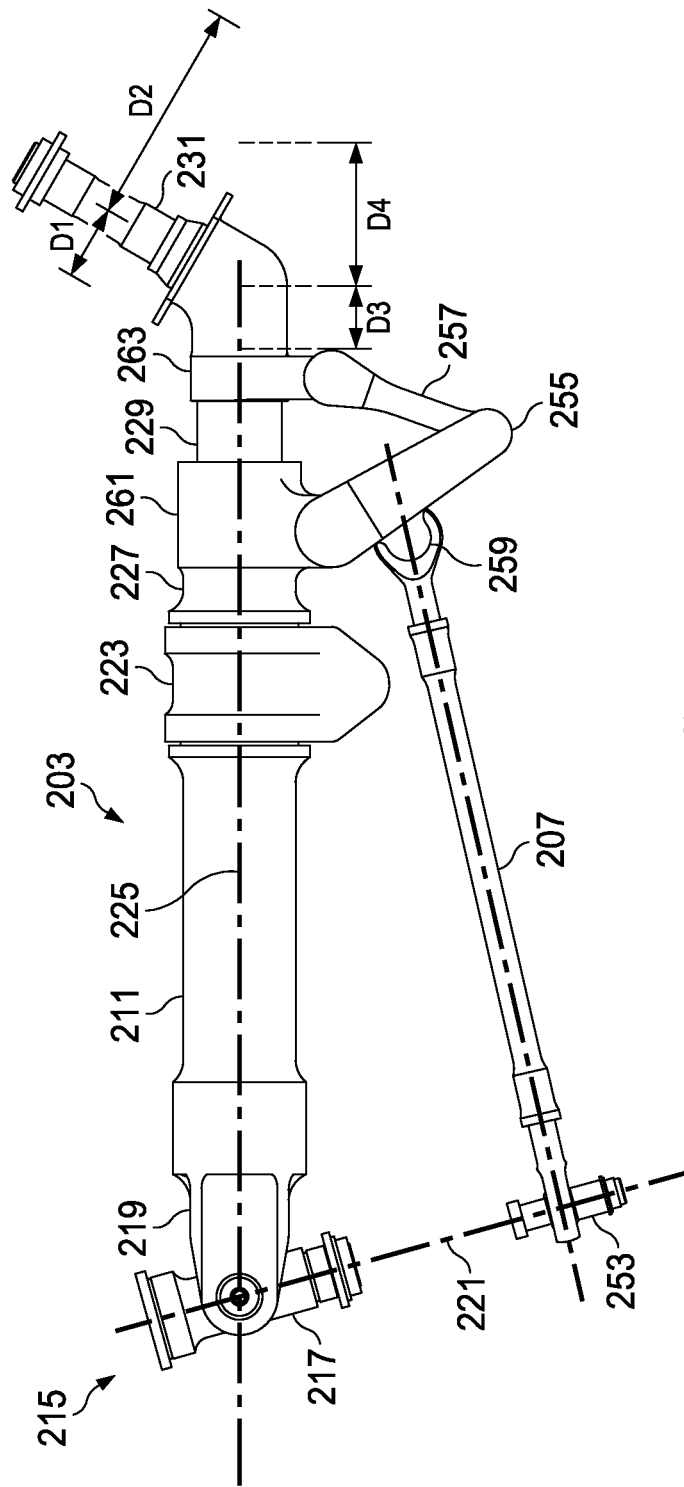
FIG. 5 is a view looking aft of the landing gear system, taken from section lines 5-5 in FIG. 3, according to one example embodiment.

Referring specifically to FIG. 5, landing gear system 113 is configured so that a vertical stroke distance experienced by tire member 209 is greater than the relative stroke experienced in the shock absorber portion along shock strut axis 225. A distance D1 represents a vertical distance experienced by tire member 209 between the static position and the fully compressed position. Similarly, a distance D2 represents a vertical distance experienced by tire member 209 between the static position and the fully extended position. A distance D3 represents a strut axis distance experienced by piston rod 229 between the static position and the fully compressed position. Similarly, a distance D4 represents a strut axis distance experienced by piston rod 229 between the static position and the fully extended position. In the illustrated embodiment, the ratio of D1 to D3 and D2 to D4 are each approximately 1 inch to 0.75 inch. One technical advantage of landing gear system 113 is that maximizing the vertical stroke distance of tire member 209, while minimizing the strut axis distance, can result in a more efficient landing gear system.

Drag brace assembly 205 includes an upper drag brace member 237 and a lower drag brace member 239 pivotally joined at a drag brace hinge 241 at the apex. A lower end portion of lower drag brace member 239 is pivotally coupled to collar 223. An upper end portion of upper drag brace member 237 is pivotally coupled to a spindle 243 that is rotatably received by an airframe 245. The location of spindle 243 forms a spindle axis 247 at the axial centerline. Spindle axis 247 traverses through the intersection point B of the centerline axis 225 and retraction rotation axis 221.

Actuator 201 is pivotally coupled to upper drag brace member 239 at a connection portion 249. Actuator 201 is also pivotally coupled to a portion of the airframe of fuselage 107. Actuator 201 is configured to selectively retract and extend strut assembly 203. In the illustrated embodiment, actuator 201 is an electromechanical actuator; however, it should be appreciated that the exact type of actuator 201 is implementation specific and that one of ordinary skill in the art with benefit of this disclosure will recognize that any variety of actuator types may be suitable.

Figure 6:
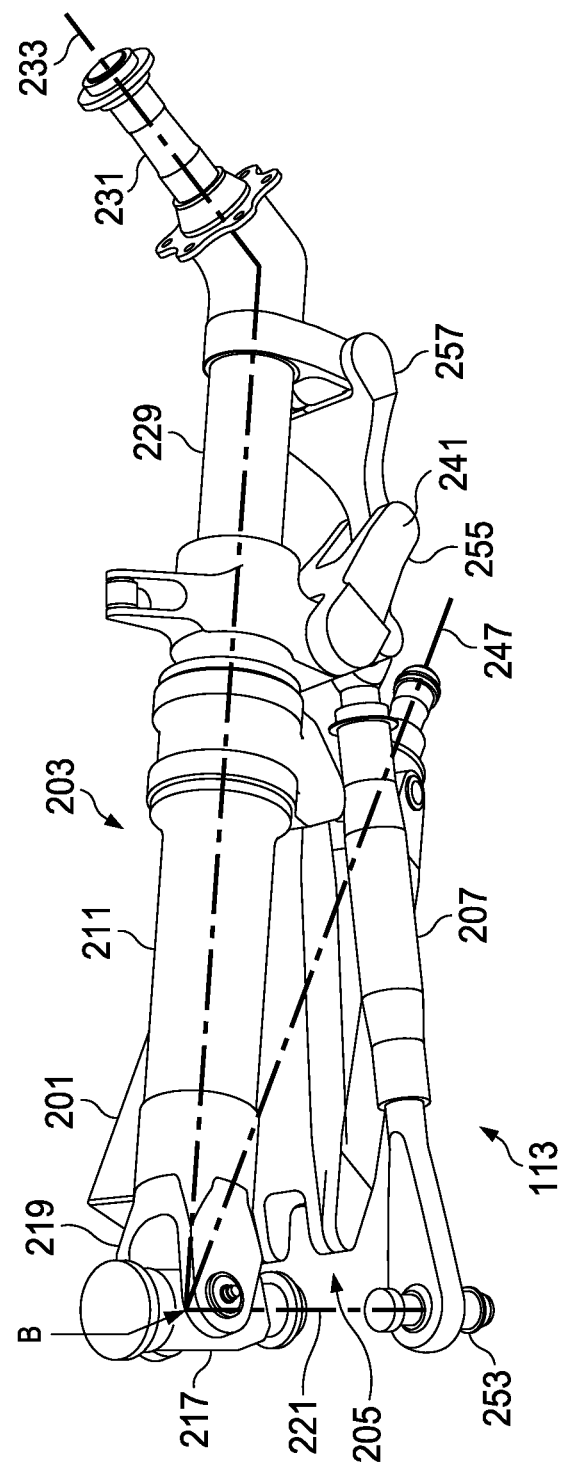
FIG. 6 is a view of the landing gear system in a retracted position, according to one example embodiment.
Figure 9A:
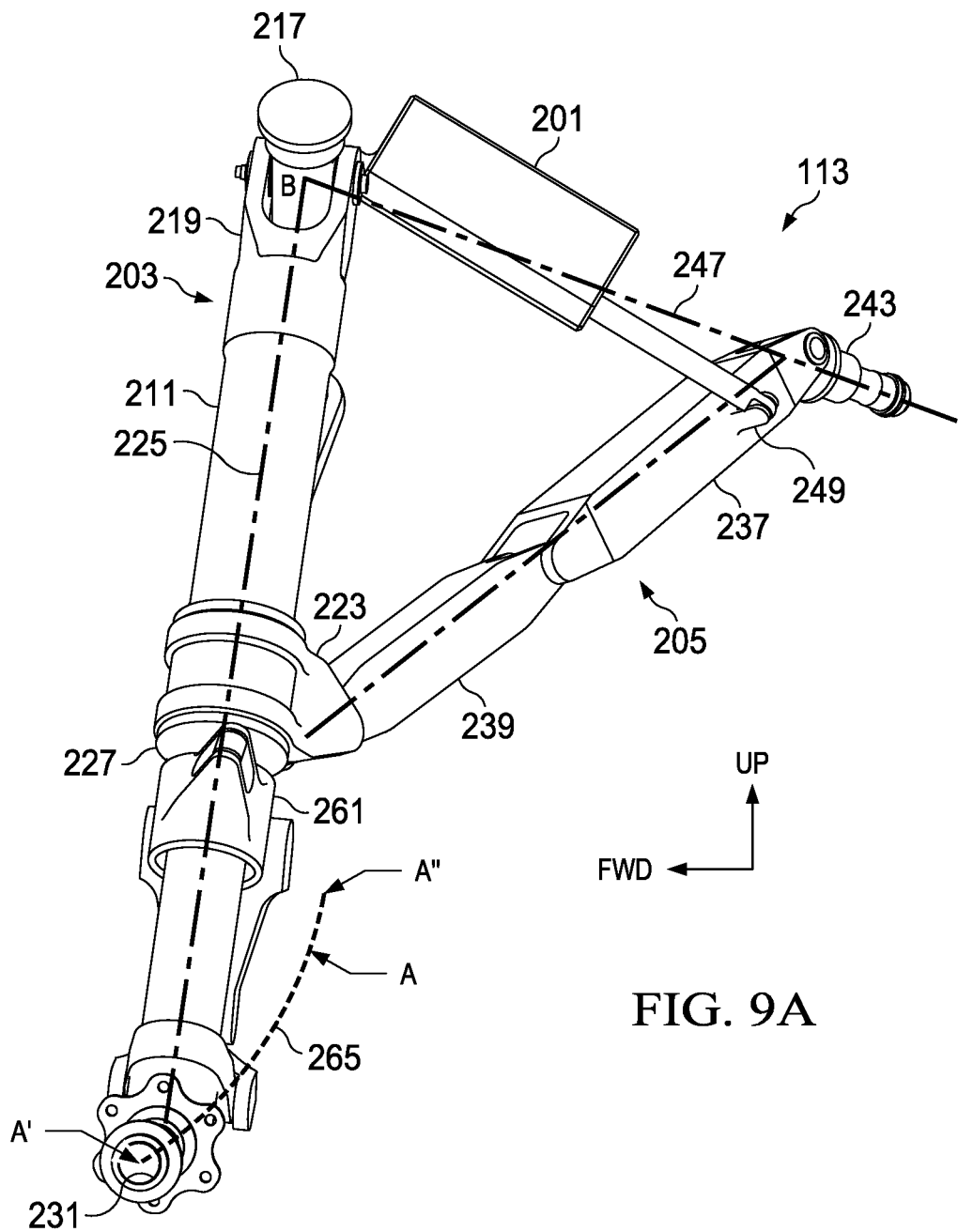
FIG. 9A is a view looking inboard of the landing gear system in a fully extended position, according to one example embodiment.
Figure 9B:
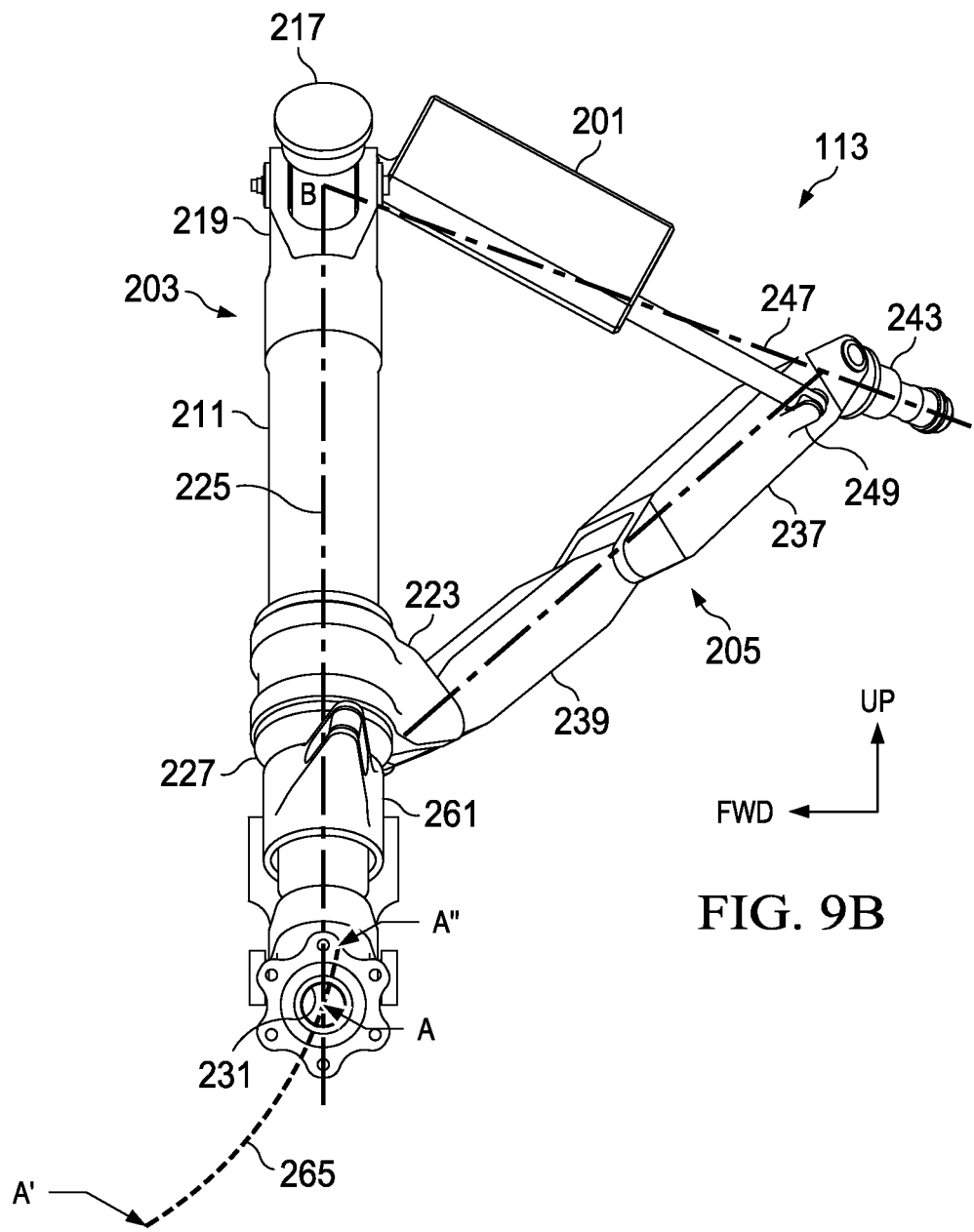
FIG. 9B is a view looking inboard of the landing gear system in a static position, according to one example embodiment.
Figure 9C:
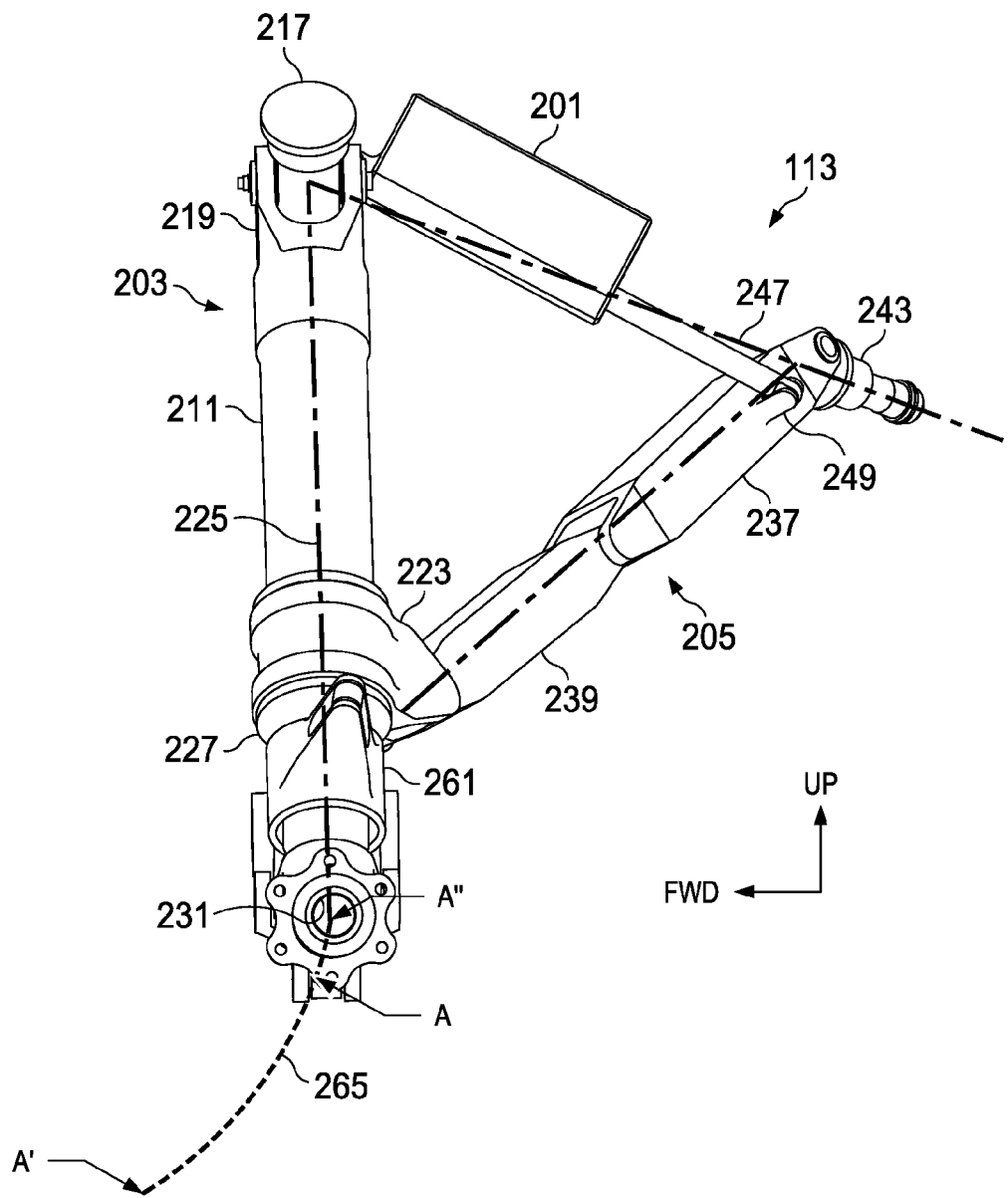
FIG. 9C is a view looking inboard of the landing gear system in a fully compressed position, according to one example embodiment.
Figure 10A:
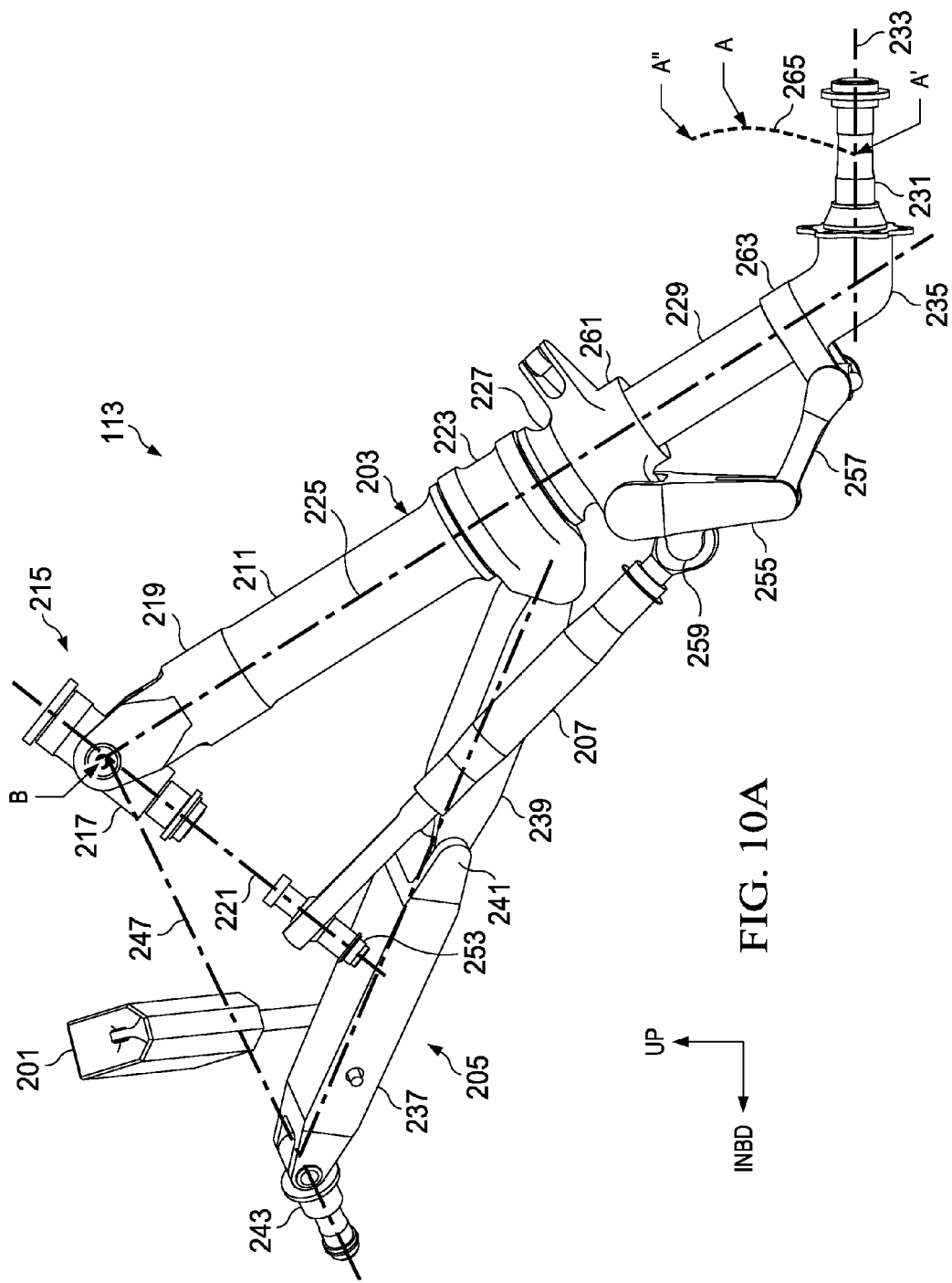
FIG. 10A is a view looking aft of the landing gear system in a fully extended position, according to one example embodiment.
Figure 10B:
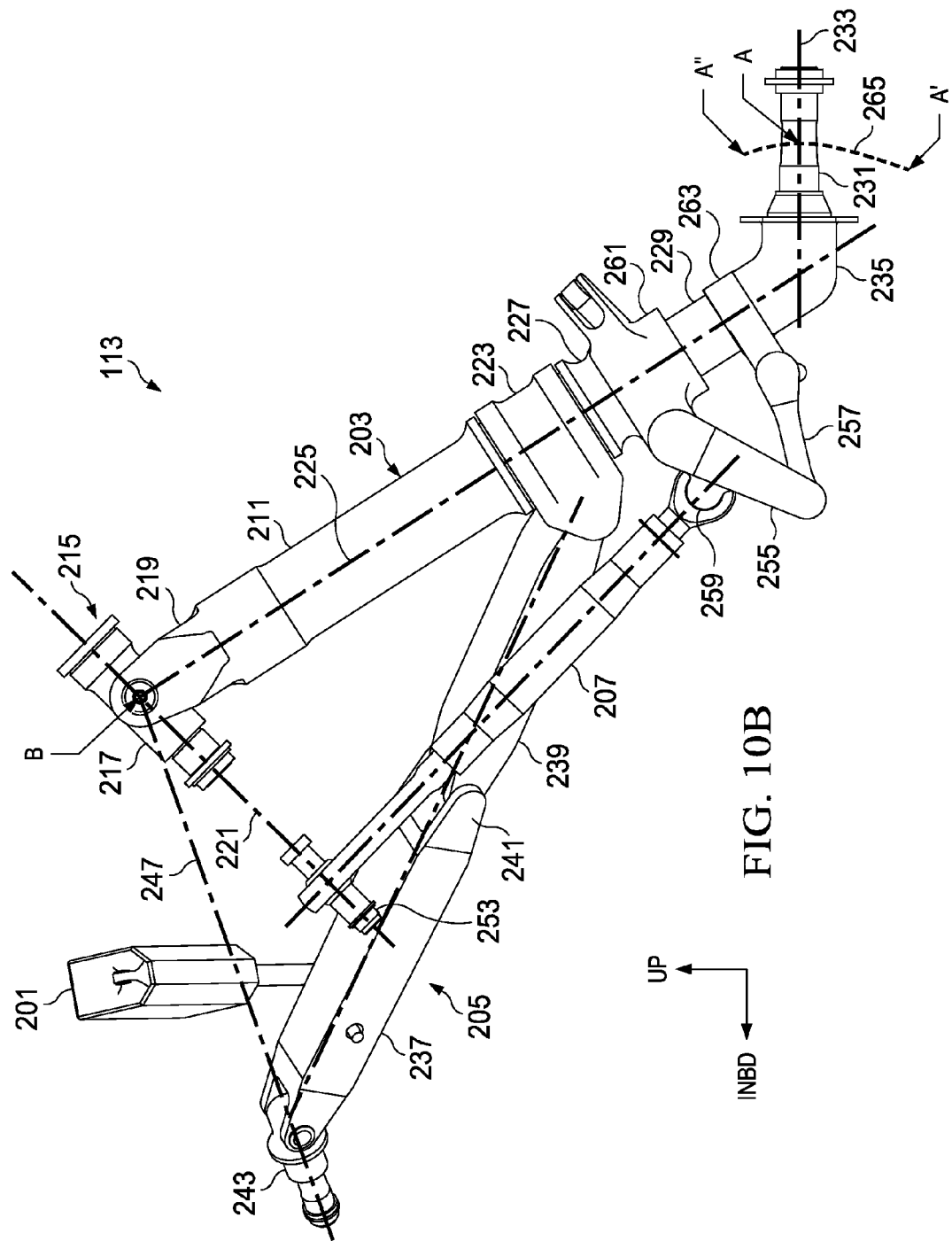
FIG. 10B is a view looking aft of the landing gear system in a static position, according to one example embodiment.
Figure 10C:
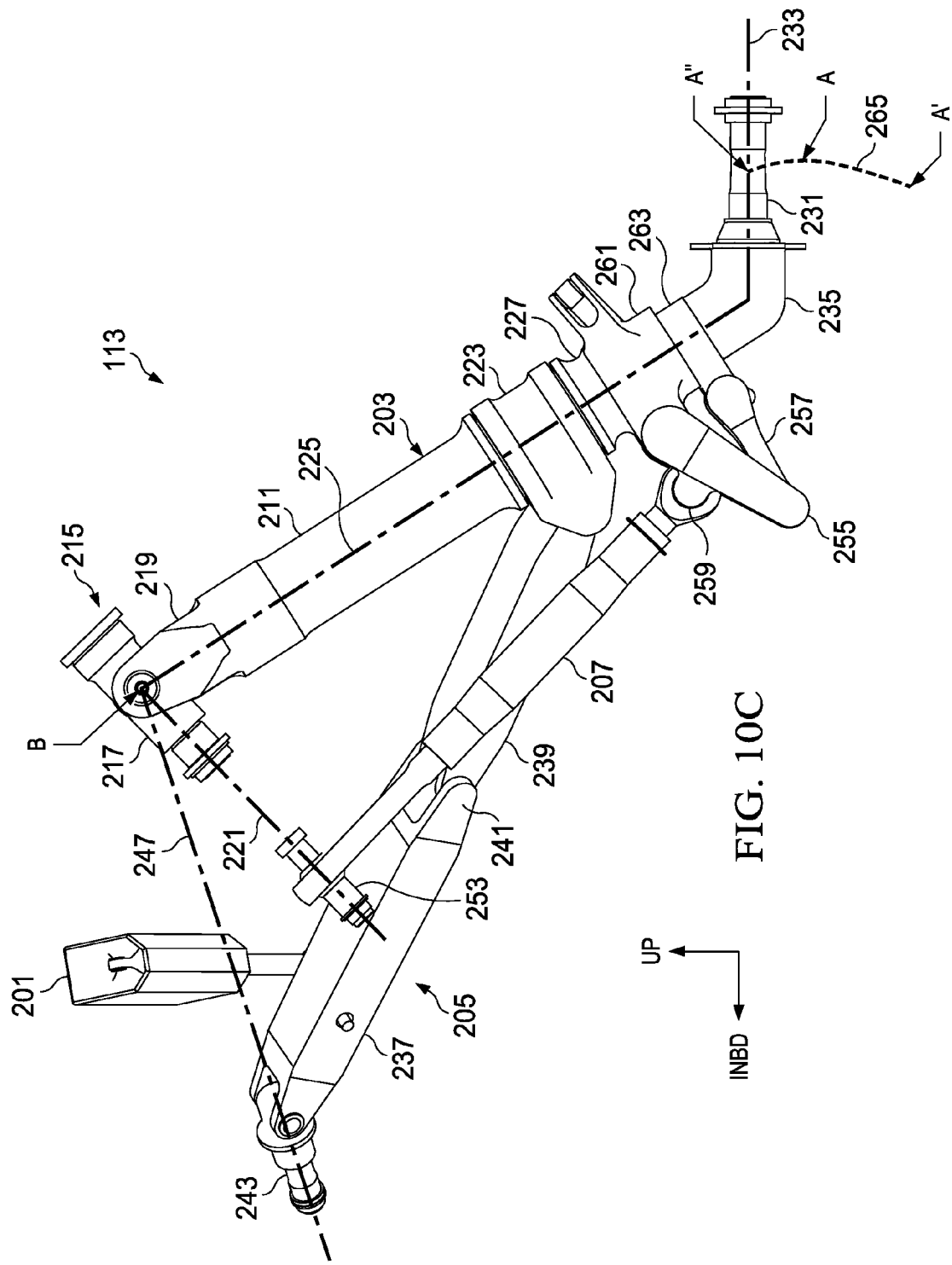
FIG. 10C is a view looking aft of the landing gear system in a fully compressed position, according to one example embodiment.

Referring briefly to FIGS. 6 and 7, landing gear system 113 is illustrated in the retracted or stowed position to illustrate the dynamics of folding landing gear system 113 about retraction rotation axis 221 via actuator 101. As illustrated, a retracting actuation of actuator 201 acts to fold drag brace assembly 205 about hinge 241, thereby causing strut assembly 203 and radius rod 207 to rotate about retraction rotation axis 221 until landing gear system 113 is compactly stowed.

Referring again to FIGS. 2-5, an upper portion of radius rod 207 is rotatably coupled to an airframe 251 via a trunnion 253. A centerline of trunnion 253 corresponds with retraction rotation axis 221. A lower portion of radius rod 207 is rotatably coupled to an upper torque arm 255 at an attachment member 259. An upper portion of upper torque arm 255 is hingedly coupled to fixed length portion 211 of strut assembly 203 at a pin joint on a fixed bracket 261. A lower portion of upper torque arm 255 hingedly coupled to an upper portion of lower torque arm 257 at a pin joint. A lower portion of lower torque arm 257 is hingedly coupled to a bracket 263 that is fixed relative to piston rod 229. Upper torque arm 255 and lower torque arm 257 join piston rod 229 and housing 227, so as to function as a toggle joint as piston rod 229 translates relative to housing 227 along centerline axis 225. Upper torque arm 255 and lower torque arm 257 are configured to collectively inhibit rotation of piston rod 229 about centerline axis 225 relative to housing 227, while partially providing a controlling force between piston rod 229 and housing 227 during relative translation therebetween. Further, the geometric orientation of radius rod 207, upper torque arm 255, and lower torque arm 257 collectively act to implement desired inboard/outboard movement of spindle 243 during a stroke of landing gear system 113, as further disclosed herein.

Referring now also to FIGS. 8, 9A-9C, and 10A-10C, the dynamic motion of landing gear system 113 is further illustrated. The geometric configuration of landing gear system 113 causes tire member 209 to move or roll in fore/aft direction along a stroke path during a stroke translation of piston rod 229 relative to housing 227 of the shock absorber, thereby reducing tire scrubbing and providing a smooth stroking during dynamic operation of landing gear system 113. The primary positions of tire member 209 during non-retracted operation are: a fully extended position A', a static position A, and a fully compressed position A". Positions A', A, and A" are illustrated as a point at the center of tire member 209 on axle spindle axis 233. During operation of landing gear system 113, the center of tire member 209 can travel along a stroke path 265 between positions A', A, and A". Fully extended position A' can be defined as the location of the center of tire member 209 when landing gear system is extended (not retracted), but does not experience any ground loading. Static position A can be defined as the location of the center of tire member 209 while the aircraft is resting on the ground so as to experience a steady state load incurred by the weight of the aircraft. Fully compressed position A" can be defined as the location of the center of tire member 209 at maximum compression of the shock absorber during the initial landing of the aircraft on the ground surface. It should be appreciated that a variety of factors and operational conditions can affect the exact location of positions A', A, and A", as one of ordinary skill in the art would appreciate having the benefit of this disclosure.

One technical advantage of the present invention is that stroke path 265 includes a significant amount of travel in the fore/aft direction, which limits the amounts the amount of inboard/outboard travel that could otherwise result in tire scrubbing. Further, the fore/aft travel along stroke path 265 can act to negate scrubbing that would otherwise result from substantial inboard/outboard travel during a stroking of the shock absorber. The fore/aft travel of tire member along stroke path 265 is derived from drag brace assembly 205 being rotatably coupled to airframe 245 with spindle 243, the spindle axis 247 having a common intersection point B with centerline axis 225 (strut stroking axis) and retraction rotation axis 221. The configuration of spindle axis 247 having common intersection point B with centerline axis 225 (strut stroking axis) and retraction rotation axis 221 causes tire member 209 to move forward (so as to roll) along stroke path 265, from position A' to position A", during a stroking compression of the shock absorber. In other words, as the shock absorber is compressed, lower torque arm 257 moves towards radius rod 207, causing upper torque arm 255 to act against radius rod 207 at connection member 259. This force reaction causes a rotation of strut assembly 203, radius rod 207, and drag brace assembly 205 about spindle axis 247 since drag brace assembly 205 does not constrain strut assembly 203 in rotation about spindle axis 247. The unique orientation of spindle 243 and corresponding spindle axis 247 results in a substantial forward movement of tire member 209 along stroke path 265 during compression of the shock absorber.

Referring in particular to FIG. 8, stroke path 265 represents the travel of the center of axle spindle axis between positions A', A, and A" during a compression of the shock absorber. As illustrated in FIG. 8, stroke path 265 includes a substantial amount of travel in the fore/aft directions and a minimal amount of travel in the inboard/outboard directions. The rolling (fore/aft movement) of tire member 209 can act to alleviate scrubbing that may otherwise result from a pure inboard/outboard movement of tire member 209. The relatively small amount of inboard/outboard movement (as best shown in FIG. 8) along stroke path 265 can be attributed to the four bar linkage created by radius rod 207, upper torque arm 255, strut assembly 203, and the airframe.

The particular embodiments disclosed above are illustrative only, as the system may be modified and practiced in different but equivalent manners apparent to those skilled in the art having the benefit of the teachings herein. Modifications, additions, or omissions may be made to the apparatuses described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

The invention claimed is:

1. A landing gear system for an aircraft, the landing gear system comprising:
   a shock strut assembly having a centerline axis, the shock strut assembly being coupled to the airframe with a universal joint;
   a drag brace assembly coupled to an airframe of the aircraft with a spindle, the spindle being rotatable about a spindle axis; and
   a radius rod rotatably coupled to the airframe of the aircraft;
   wherein the radius rod and the shock strut assembly are retractable about a retraction rotation axis;
   wherein the spindle axis has a common intersection point with the centerline axis and the retraction rotation axis.

2. The landing gear system according to claim 1, further comprising:
   a tire member mounted to an axle on the shock strut assembly;
   wherein the orientation of the spindle axis causes a translation of the tire member to have a longitudinal component during a compression of the shock strut assembly.

3. The landing gear system according to claim 1, the drag brace assembly comprising:
   an upper drag brace and a lower drag brace coupled together at a hinge.

4. The landing gear system according to claim 3, further comprising:
   an actuator coupled to the upper drag brace, the actuator being configured to selectively retract the landing gear system.

5. The landing gear system according to claim 1, the shock strut assembly comprising:
   a collar rotatable about the centerline axis, the drag brace assembly being coupled to the collar.

6. The landing gear system according to claim 1, the universal joint comprising:
   a trunnion rotatably coupled to the airframe, the trunnion having a trunnion axis that is coaxial with the retraction rotation axis.

7. The landing gear system according to claim 6, the universal joint further comprising:
   a clevis fitting rotatably coupled to the trunnion.

8. The landing gear system according to claim 7, wherein the clevis fitting is rotatably about a clevis axis, the clevis axis being approximately parallel to a longitudinal axis of the aircraft when the landing gear system is in a static position.

9. The landing gear system according to claim 1, the shock strut assembly further comprising:
   an elbow member configured for joining the piston rod and an axle spindle, the elbow joint orienting the axle spindle at angle that is greater than 90 degrees to the centerline axis of the shock strut assembly.

10. A landing gear system for an aircraft, the landing gear system comprising:
    a shock strut assembly having a centerline axis, the shock strut assembly being coupled to the airframe with a universal joint; and
    a drag brace assembly coupled to an airframe of the aircraft with a spindle, the spindle being rotatable about a spindle axis;
    a radius rod rotatably coupled to the airframe of the aircraft;
    wherein the spindle axis intersects a center of the universal joint;
    wherein the radius rod and the shock strut assembly are retractable about a retraction rotation axis;

wherein the spindle axis has a common intersection point with the centerline axis and the retraction rotation axis.

11. The landing gear system according to claim 10, further comprising:
   a collar for coupling the drag brace assembly to the shock strut assembly;
   wherein the spindle is located aft and inboard to the collar.

12. The landing gear system according to claim 10, further comprising:
   an upper torque arm;
   a lower torque arm;
   a radius rod coupled between the airframe and the upper torque arm;
   wherein a compression of a shock absorber portion of the shock strut assembly imparts a levering force that causes rotation in part around the spindle axis.

13. The landing gear system according to claim 10, further comprising:
   an actuator coupled to the drag brace assembly;
   wherein selective actuation of the actuator can retract and deploy the landing gear system by rotation about a retraction rotation axis.

\* \* \* \* \*